US008577366B2

(12) United States Patent
Iwata (10) Patent No.: US 8,577,366 B2
(45) Date of Patent: Nov. 5, 2013

(54) BASE STATION AND CONTROL METHOD OF BASE STATION (75) Inventor: Kei Iwata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 139 days.

(21) Appl. No.: 13/121,403

(22) PCT Filed: Sep. 28, 2009

(86) PCT No.: PCT/JP2009/066817
§ 371 (c)(1),
(2), (4) Date: Mar. 28, 2011

(87) PCT Pub. No.: WO2010/035842
PCT Pub. Date: Apr. 1, 2010

(65) Prior Publication Data
US 2011/0177836 A1 Jul. 21, 2011

(30) Foreign Application Priority Data
Sep. 29, 2008 (JP) ................................ 2008-250854

(51) Int. Cl.
*H04W 4/00* (2009.01)
(52) U.S. Cl.
USPC ...................................... 455/435.2; 455/458
(58) Field of Classification Search
USPC ............. 455/435.1, 435.2, 458; 370/328, 329
See application file for complete search history.

(56) References Cited

U.S. PATENT DOCUMENTS

| 5,973,097 A | 10/1999 | Dantiki et al. |
| 2007/0183427 A1 | 8/2007 | Nylander et al. |
| 2010/0054219 A1* | 3/2010 | Humblet et al. ............... 370/338 |
| 2011/0177836 A1 | 7/2011 | Iwata |

FOREIGN PATENT DOCUMENTS

| CN | 1739267 A | 2/2006 |
| JP | 10-164665 A | 6/1998 |
| JP | 2003-348104 A | 12/2003 |
| KR | 2000-0060784 A | 10/2000 |
| KR | 10-0758828 B1 | 9/2007 |
| WO | 2004/057815 A2 | 7/2004 |
| WO | 2007/040449 A1 | 4/2007 |
| WO | 2010/035842 A1 | 4/2010 |

OTHER PUBLICATIONS

Hirose, translation of JP 2003-348104, A Detailed Description.*

(Continued)

*Primary Examiner* — Lewis West
(74) *Attorney, Agent, or Firm* — Procopio, Cory, Hargreaves & Savitch LLP (57) ABSTRACT

Provided is a scheme of a base station to avoid interference with a macrocell, wherein the base station prompts a terminal to perform handoff from the macrocell by using a pilot beacon. The base station of a mobile communication system includes a transmission unit for transmitting the pilot beacon such that a mobile terminal detects the base station, a registration unit for registering information on mobile terminals to use the base station or users corresponding to these mobile terminals, and a control unit for controlling the transmission unit to stop transmission of the pilot beacon if all mobile terminals registered with the registration unit perform location registration to the base station, based on information on mobile terminals which perform location registration to the base station or corresponding users and based on the information on the mobile terminals registered with the registration unit or the corresponding users.

5 Claims, 10 Drawing Sheets

(56) References Cited

OTHER PUBLICATIONS

International Search Report dated Dec. 15, 2009 issued by the Japanese Patent Office for International Application No. PCT/JP2009/066817.

Office Action dated Jul. 30, 2012, issued in counterpart Korean Application No. 10-2011-7007113.
Final Office Action dated Jan. 8, 2013, issued in counterpart Korean Application No. 10-2011-7007113.
Office Action dated Jul. 16, 2013, issued in counterpart Chinese Application No. 201080009283.6.

* cited by examiner

| Maximum Registerable Number | | | 4 |
|---|---|---|---|
| Registered Terminal Information | | | |
| | Number of Registered Terminals | | 3 |
| | Registered Terminal ESN | | |
| | | ESN[1] | 0x12345678 |
| | | ESN[2] | 0xab12cd34 |
| | | ESN[3] | 0x9f8e7d6c |
| | Session Information | | |
| | Number of Sessions | | 2 |
| | Connected Terminal UATI | | |
| | | UATI[1] | 0x011a2b3c |
| | | UATI[2] | 0x017d89ef |
| | | UATI[3] | 0 |

BASE STATION AND CONTROL METHOD OF BASE STATION

CROSS REFERENCE TO RELATED APPLICATION

This application claims priority to and the benefit of Japanese Patent Application No. 2008-250854 filed on Sep. 29, 2008, the entire contents of which are incorporated herein by reference.

TECHNICAL FIELD

The present invention relates to base stations and control methods of base stations, and more particularly, to base stations (femtocell) for connecting to a mobile communication network via a public link and control methods of the base stations.

BACKGROUND ART

In a mobile communication system, there has recently been suggested a system of a base station called femtocell which covers a small area in comparison to that of a conventional base station (wide area base station, macrocell). The femtocell is a small base station installed in a house, a small office and the like, for example. While a cell of a conventional mobile phone, that is, an area covered by the wide area base station is about 1 to several kilometers in radius, an area covered by the femtocell is only about a few to tens of meters.

The femtocell is connected to the mobile communication network via the public link (broadband link such as ADSL or the like) drawn into each house. The public link has been in widespread use as an access link. Hence, if the broadband link is available, a user even outside the service area of the macrocell can easily use mobile phone services (a telephone call, a message function, an SMS (Short Message Service), a WEB browsing function and the like) similar to those provided by the macrocell, at a low cost. In addition, there is an advantage also for a carrier that it can improve a mobile phone area at a low cost, as usage of the femtocell and the broadband link by a user enables the carrier to save a resource (band or the like) of an existing wide area base station, which is originally supposed to be consumed.

Therefore, it is expected that, in 3 Generation (3G), 3.9 Generation (3.9G) and IMT-ADVANCED using a frequency band of 2 GHz or more, it becomes essential to combine the wide area base station placed outdoors and the femtocell installed indoors. In addition, since it is considered preferable that only registered terminals (mobile terminals) are allowed to use the femtocell, a limited number of users registered can occupy the femtocell in such a preferred condition. Accordingly, the femtocell has an advantage to offer a faster data communication environment of better quality in comparison to the macrocell which may be overcrowded with multiple users, and thus it is expected to be popularly used in the future.

Because of the advantages of the femtocell described above, it may be likely that the user capable of using a femtocell service wishes to connect to the femtocell when entering a femtocell service area from a macrocell service area. As a method to perform handoff from the macrocell to the femtocell, it is assumed to use a pilot beacon. Although it is desired that the femtocell uses a frequency different from that used by the macrocell in order to avoid interference with the macrocell, it is preferred to transmit the pilot beacon at the same frequency as that of the macrocell in order to lead the terminal communicating with the macrocell to the femtocell.

However, in this case, there is a problem that the pilot beacon and the macrocell interfere with each other.

In order to handle such a problem, there is suggested a conventional scheme to prevent an adverse effect on other systems using the same frequency (for example, see Patent Document 1). According to the scheme described in Patent Document 1, transmission of a beacon frame is stopped if there is no wireless station terminal in a wireless area of an access point of a wireless LAN.

PRIOR ART DOCUMENT

Patent Document

Patent Document 1: Japanese Patent Laid-Open No. 2003-348104

SUMMARY OF INVENTION

Technical Problem

For the following reasons, only limited terminals can connect to the femtocell. First, since a leased link (femtocell user subscription link) subscribed by the user is used as a network from the femtocell to the mobile communication network, it is a problem to allow for connection of any terminal, in terms of contracts and security. Also, the carrier (communication carrier) providing the femtocell service may not allow connection of unspecified terminals because of the necessity for access control.

Therefore, it is assumed that the femtocell allows only terminals (registered terminals) registered to use the femtocell. In this case, since the femtocell is installed in a house, an office and the like, it may happen that there is no registered terminal in the femtocell service area or all of the registered terminals locate in the area. Although the femtocell needs to transmit the pilot beacon in the former condition, it does not need to transmit the pilot beacon in the latter condition, as all of the registered terminals are already in a standby state in the femtocell and thus no further terminals will request connection through handoff. In order to prevent unnecessary interference with the macrocell, it should refrain from transmitting the pilot beacon as much as possible. Accordingly, it is not desirable to transmit the pilot beacon in the latter condition.

Although the scheme described in Patent Document 1 suggests improvement of the former condition, it does not consider the latter condition. That is, this reference does not disclose limitation of transmission of the pilot beacon when there are registered terminals within a service area of the femtocell.

Accordingly, it is an object of the present invention to provide a base station (femtocell) which, using the pilot beacon for handoff from the macrocell to the base station, avoids interference with the macrocell by stopping transmission of the pilot beacon if all of the registered terminals are in the standby state.

Solution to Problem

In order to solve the above problems, a base station of a mobile communication system (base station (femtocell)) connected to a mobile communication network via a public link (broadband link such as ADSL or the like)) according to the present invention includes:

a transmission unit (wireless communication unit) for transmitting a pilot beacon such that a mobile terminal detects the base station;

a registration unit for registering information on (at least one) a mobile terminal to use the base station or a user corresponding to the mobile terminal; and a control unit (transmission control unit or control unit) for controlling the transmission unit to stop transmission of the pilot beacon if all of terminals registered with the registration unit perform location registration (establish session) to the base station, based on information on a mobile terminal which performs location registration (establish session) to the base station or a user corresponding to this mobile terminal and based on the information on the terminal registered with the registration unit the user corresponding to this mobile terminal.

In addition, according to one embodiment of the present invention, the base station of the mobile communication system (base station (femtocell) connected to the mobile communication network via the public link (broadband link such as ADSL or the like)) is characterized in that the control unit controls the transmission unit to restart transmission of the pilot beacon when a mobile terminal which has performed location registration (has established session) to the base station is released while the transmission of the pilot beacon is stopped.

Although apparatuses are used as solutions as described above according to the present invention, it is appreciated that the present invention can also be implemented by methods, programs, storage media storing the programs and thus they are included within a scope of the present invention. Each step of method described below or program may use an arithmetic processing unit such as a CPU, a DSP or the like, as necessary, to process data, and input data and processed or generated data are stored in a storage device such as an HDD, a memory or the like.

For example, as a method implementing the present invention, a control method of a base station of a mobile communication system includes the steps of:

transmitting a pilot beacon such that a mobile terminal detects the base station;

registering information on (at least one) a mobile terminal to use the base station or a user corresponding to the mobile terminal; and controlling to stop transmission of the pilot beacon if all of terminals registered with the base station perform location registration to the base station, based on information on a mobile terminal which performs location registration to the base station or a user corresponding to this mobile terminal and based on the information on the terminal registered at the step of registering or the user corresponding to this mobile terminal.

Effect of the Invention

According to the present invention, the base station (femtocell) using the pilot beacon for handoff from the macrocell to the base station itself, can avoid interference with the macrocell by stopping transmission of the pilot beacon if all of the registered terminals are in a standby state.

DESCRIPTION OF EMBODIMENT

An embodiment of the present invention will be described in detail with reference to the accompanying drawings. In the following description, it is assumed to use CDMA2000 1xEV-DO as an exemplary mobile communication system.

Figure 1:
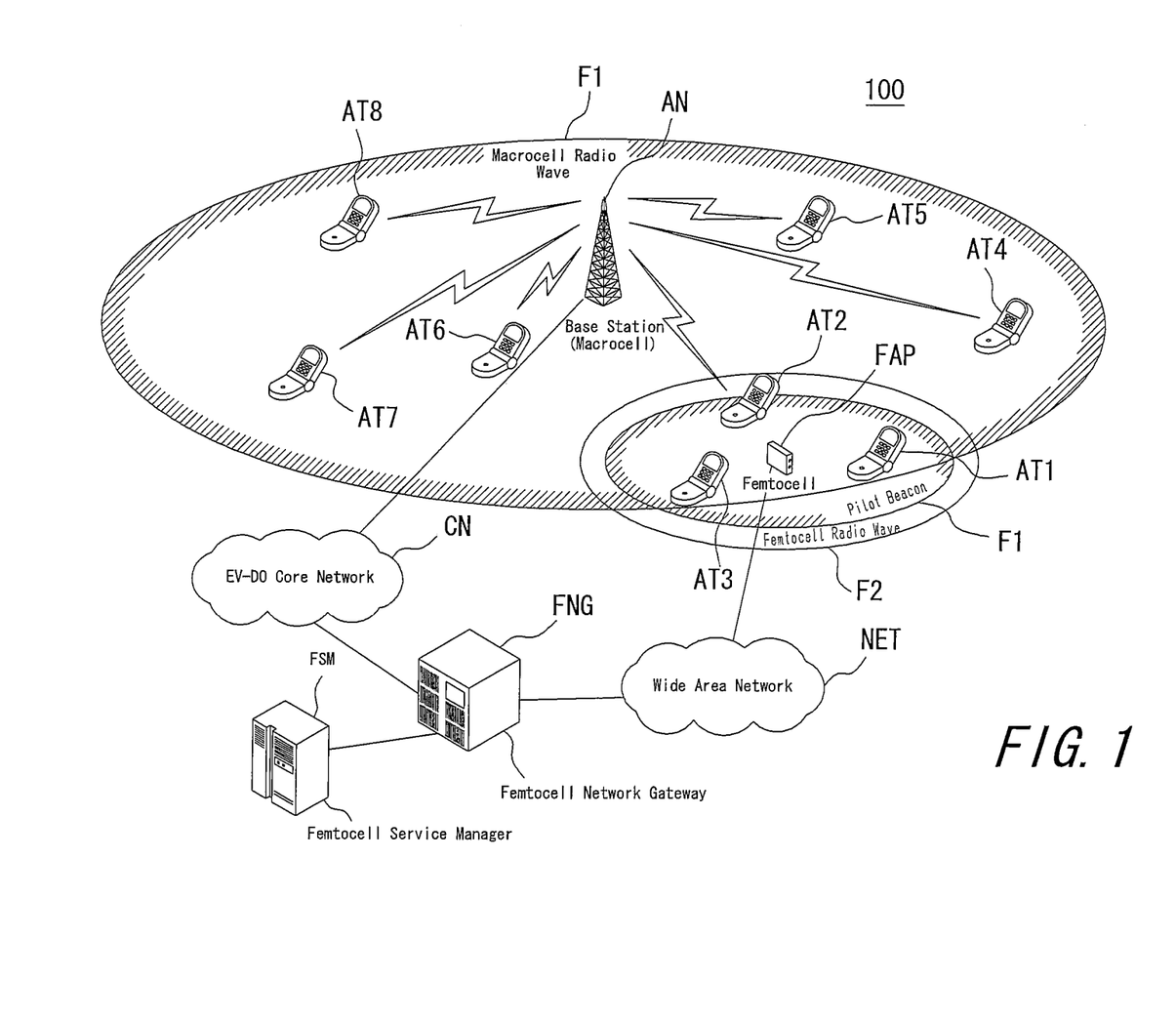
FIG. 1 is a schematic configuration diagram illustrating a mobile communication system including a femtocell and a macrocell.

FIG. 1 is a schematic configuration diagram illustrating a mobile communication system including a femtocell and a macrocell. As shown in the figure, a mobile communication system 100 includes a base station (macrocell, access network) AN, an EV-DO core network CN, a femtocell network gateway FNG a femtocell service manager FSM, a wide area network NET, a femtocell FAP, and a plurality of terminals (mobile terminals) AT 1-AT8.

The EV-DO core network CN is a backbone portion of the mobile communication network including PDSN (Packet Data Serving Node), PCF (Packet Control Function) and the like, that are not shown in the figure. The femtocell service manager FSM manages a plurality of femtocells FAP, and also associates and manages identifiers of the femtocells and information on user terminals registered with the femtocells. The femtocell network gateway FNG relays a connection between the wide area network NET and the EV-DO core network CN.

In the mobile communication system 100, the macrocell AN transmits macrocell radio waves at a frequency F1. The femtocell FAP transmits a pilot beacon at the frequency F1, which is the same frequency as the macrocell radio waves, in order to lead a terminal in communication with the macrocell to the femtocell (to prompt handoff). In addition, the femtocell FAP itself transmits femtocell radio waves at a frequency F2.

Figure 2:
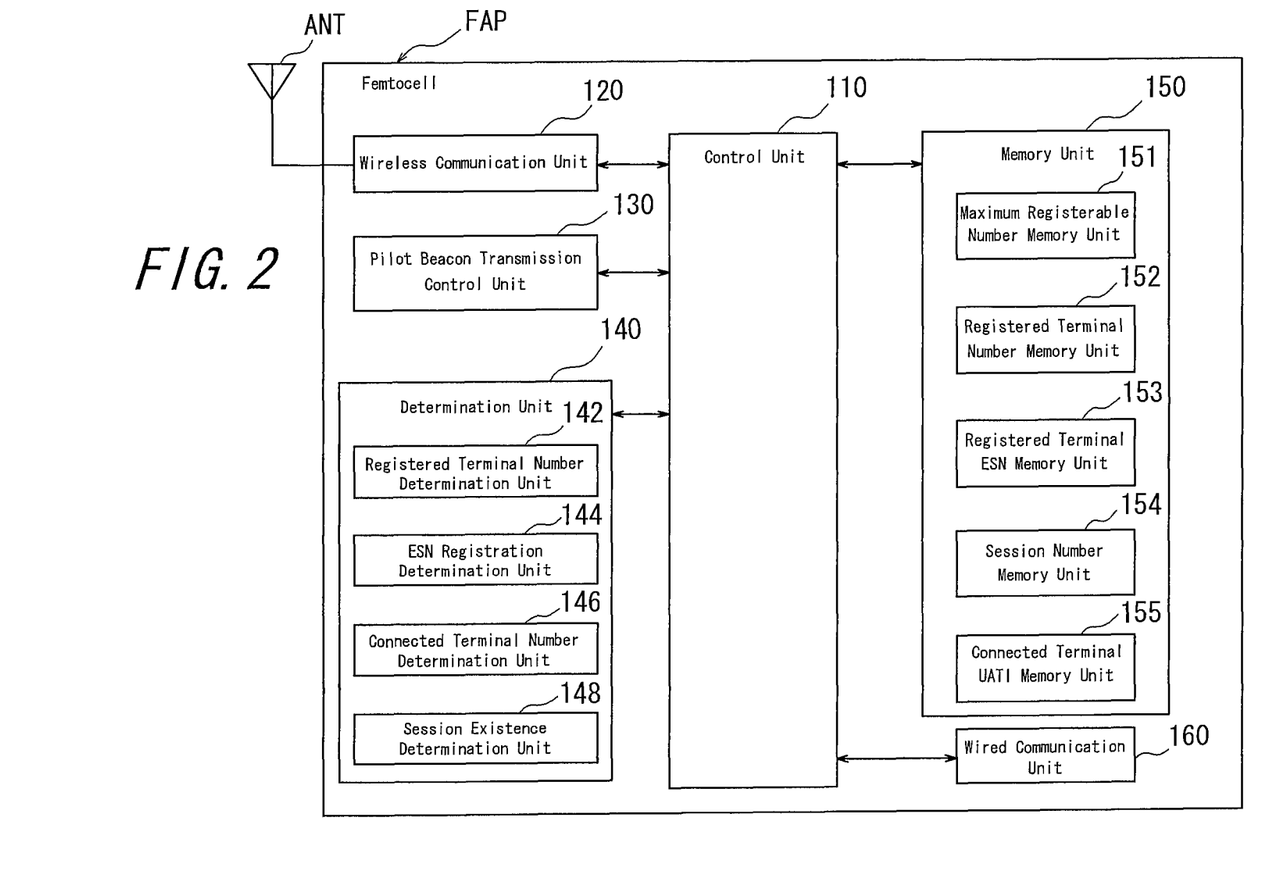
FIG. 2 is a schematic block diagram illustrating a femtocell FAP.

Next, the femtocell FAP will be described. FIG. 2 is a schematic block diagram illustrating the femtocell FAP. As shown in the figure, the femtocell FAP includes an antenna ANT, a control unit 110, a wireless communication unit 120, a pilot beacon transmission control unit 130, a determination unit 140, a memory unit 150 and a wired communication unit 160. The wireless communication unit 120 transmits and receives radio waves for communication with the terminal (mobile terminal) AT via the antenna ANT. The wireless communication unit 120 also transmits the pilot beacon via the antenna ANT. The control unit 110 is responsible for control of overall femtocell FAP. The pilot beacon transmission control unit 130 controls start and stop of transmission of the pilot beacon.

The determination unit 140 includes a registered terminal number determination unit 142, an ESN registration determination unit 144, a connected terminal number determination unit 146 and a session existence determination unit 148. The registered terminal number determination unit 142 determines whether the number of registered terminals allowed to use the femtocell FAP (base station itself) has reached a maximum number of terminals that the femtocell FAP can register. The ESN registration determination unit 144 determines whether an ESN (Electric Serial Number) obtained from the terminal or the EV-DO core network CN is identical to an ESN registered with the femtocell FAP (ESN will be described below). The connected terminal number determination unit 146 determines whether the number of terminals in a standby state in the femtocell FAP is equal to the number of terminals the base station can register. The session existence determination unit 148 determines whether there is a session between the terminal having the ESN notified from the terminal or the EV-DO network CN and the femtocell FAP (whether location has been registered).

The memory unit 150 includes a maximum registerable number memory unit 151, a registered terminal number memory unit 152, a registered terminal ESN memory unit 153, a session number memory unit 154 and a connected terminal UATI memory unit 155. The maximum registerable number memory unit 151 stores a maximum number of terminals that the femtocell FAP can register. The registered terminal number memory unit 152 stores the number of registered terminals. The registered terminal ESN memory unit 153 stores the ESN of each registered terminal. The session number memory unit 154 stores the number of sessions established between the femtocell FAP and the terminals. The connected terminal UATI memory unit 155 stores a UATI (Unicast Access Terminal Identifier) of the terminal having a session established with the femtocell FAP, that is, the terminal in the standby state in the femtocell FAP or connected to it (the UATI will be described below). The wired communication unit 160 is connected to the wide area network NET such as the Internet via a router and a public link (broadband link such as ADSL or the like).

Figure 3:
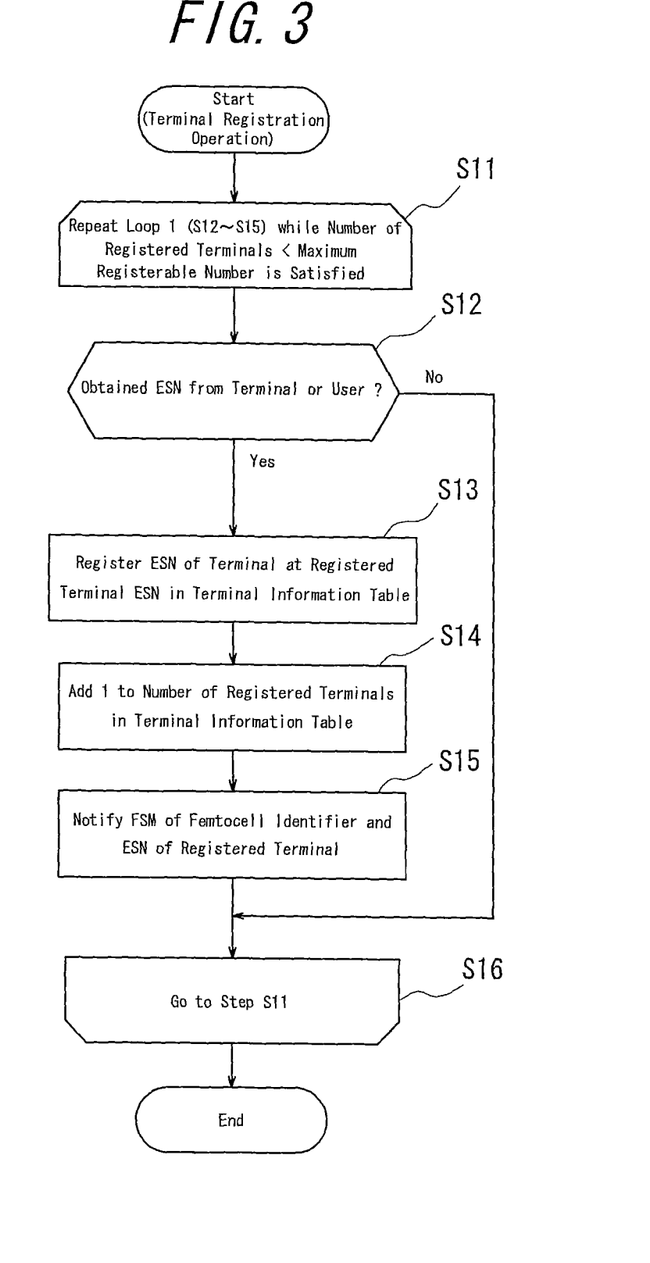
FIG. 3 is an exemplary flowchart of user terminal registration processing by the femtocell FAP.

Before description of control of the pilot beacon by the femtocell FAP, it is described about processing by the femtocell FAP to register terminals allowed to use the femtocell FAP. FIG. 3 is an exemplary flowchart of the processing by the femtocell FAP to register terminals which can use the femtocell FAP. If the number of registered terminals currently stored in the registered terminal number memory unit 152 has not reached the maximum number stored in the maximum registerable number memory unit 151, the registered terminal number determination unit 142 repeats processing in a loop 1 (steps S12-S15).

First, at step S12, the ESN registration determination unit 144 determines whether information on the terminal to register is obtained. In an example in the figure, the ESN is used as exemplary information on the terminal to register. The ESN is a unique number (terminal identifier) of a terminal and, if the terminal is a mobile phone, the ESN can be calculated from its phone number or the like. The ESN may be obtained from a direct input by the user through an operation input unit such as a keyboard or the like of the femtocell FAP, which is not shown, or the terminal may transmit it to the femtocell FAP wirelessly. The information on the registered terminal may be not only information on the terminal but also a user (subscriber) who has a contract with a carrier providing the femtocell FAP and is allowed to use the femtocell FAP. If the user uses a plurality of terminals, it is favorable to register the latter information.

If the ESN is obtained at step S12, the control unit 110 shifts to step S13 to store the ESN obtained in the registered terminal ESN memory unit 153. Then, at step S14, the control unit 110 stores the number of terminals currently registered in the registered terminal number memory unit 152. In addition, at step S15, the control unit 110 informs the femtocell service manager FSM which controls the femtocell of a unique femtocell identifier and the ESN of the terminal registered. The femtocell service manager FSM associates and manages the femtocell identifiers of the plurality of femtocells and information on the terminals registered with the femtocells (information on the terminals or on the users of the terminals). Then, when the number of terminals stored in the registered terminal number memory unit 152 reaches the maximum number stored in the maximum registerable number memory unit 151, the processing ends. Although the ESN is used as the terminal identifier, any identifiers the femtocell can obtain from the wide area network NET may be used.

Figure 4:
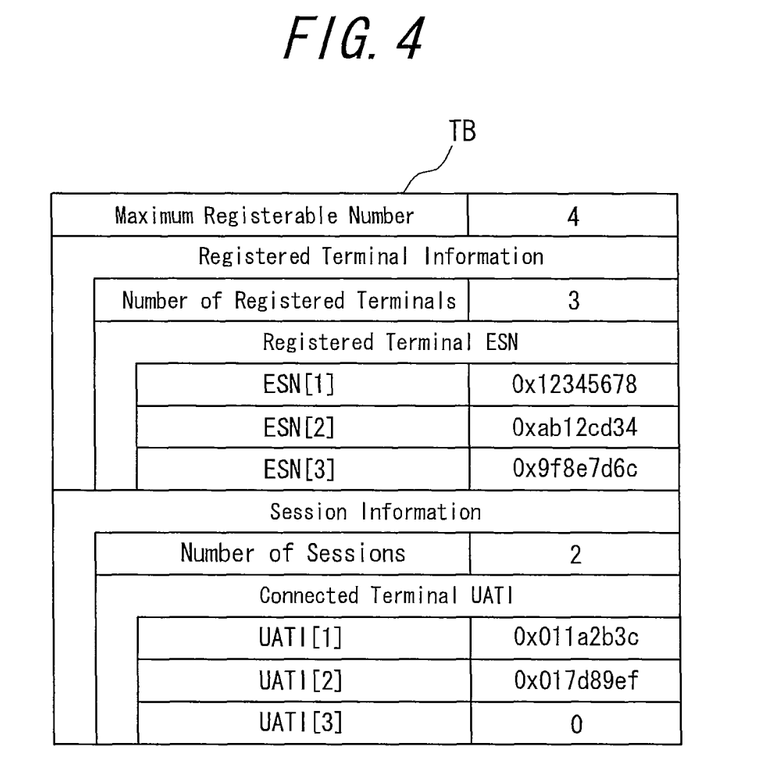
FIG. 4 is a diagram illustrating an exemplary terminal information table TB.

By the processing to register terminals by the femtocell FAP in FIG. 3, the memory unit 150 stores a terminal information table TB as shown in FIG. 4. In an example in the figure, the terminal information table TB of the femtocell FAP stores information that the maximum registerable number is 4 and the number of terminals currently registered is 3. In addition, the terminal information table TB also stores ESNs of the terminals currently registered and UATIs, which will be described in detail below, of the terminals having established sessions with the femtocell FAP.

Figure 5:
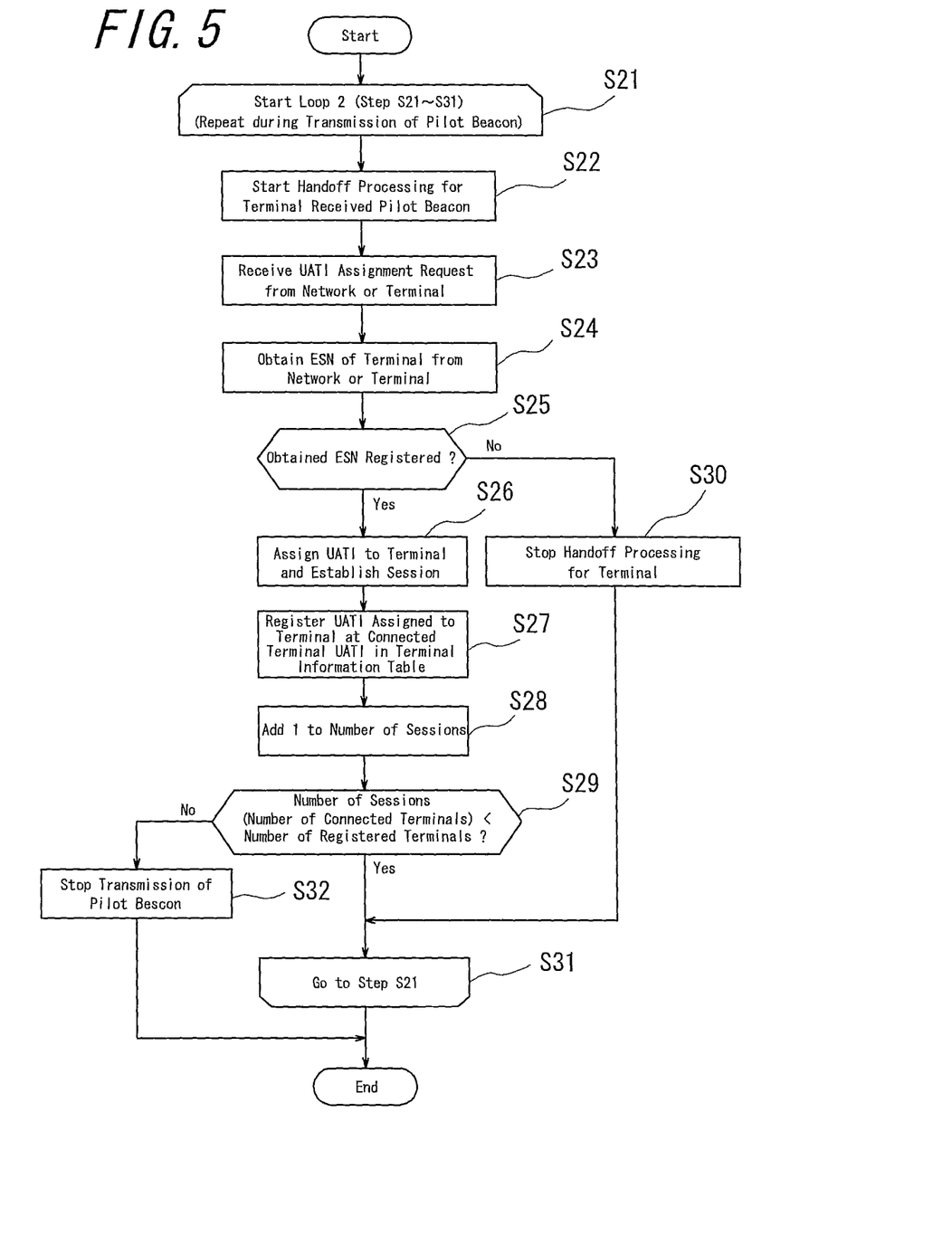
FIG. 5 is an exemplary flowchart of processing to stop transmission of a pilot beacon by the femtocell FAP.

Next, processing to stop transmission of the pilot beacon by the femtocell FAP is described. Until all of the registered terminals perform location registration, that is, until they establish sessions of such as standby or connection, the femtocell FAP continues to transmit the pilot beacon for leading terminals from the macrocell AN to the femtocell FAP. Then, if all of the terminals registered with the femtocell FAP perform location registration (establish sessions), the femtocell FAP stops transmission of the pilot beacon. FIG. 5 is an exemplary flowchart of processing to stop transmission of the pilot beacon by the femtocell FAP stated above. The femtocell FAP repeats processing in a loop 2 (steps S21-S31) during transmission of the pilot beacon. First, at step S22, the femtocell FAP starts processing of handoff (active handoff or idle handoff) from the macrocell for the terminal received the pilot beacon that the femtocell FAP transmitted.

At step S23, the wireless communication unit 120 or the wired communication unit 160 receives a UATI assignment request from the terminal or the EV-DO core network CN, respectively. Here, the UATI is an identifier temporality provided by a base station to a terminal connected thereto (terminal having an established session therewith). The base station determines whether to permit connection of the terminal, based on the UATI. Accordingly, the macrocell AN and the femtocell FAP assign respective UATIs to the terminal requesting communication therewith. In case of active handoff performed while in communication with the macrocell AN, the terminal AT, upon reception of the pilot beacon from the femtocell FAP, informs the macrocell AN of handoff. In addition, the macrocell AN requests the femtocell FAP to assign the UATI (UATI Assignment) via PCF (Packet Control Function) and PDSN (Packet Data Serving Node). That is, the femtocell FAP receives the UATI assignment request from the EV-DO core network CN. In contrast, in case of idle (dormant) handoff performed in a standby state in the macrocell AN, the terminal AT, upon reception of the pilot beacon from the femtocell FAP, transmits the UATI assignment request to the femtocell FAR Next, after receiving the UATI assignment request at step S24, the femtocell FAP obtains the ESN of the terminal requesting the UATI assignment from the EV-DO core network CN or the terminal. The ESN of the terminal can be obtained from PCF or PDSN connected to the macrocell AN by the wired communication unit 160 or from the terminal itself via the wireless communication unit 120. After obtaining the ESN, the ESN registration determination unit 144 of the femtocell FAP determines, at step S25, whether the ESN obtained is already registered and stored in the registered terminal ESN memory unit 153. If it is determined at step S25 that the ESN is not registered, the processing shifts to step S30 where the femtocell FAP stops handoff processing for the terminal.

In contrast, if it is determined at step S25 that the ESN obtained is already registered, the processing shifts to step S26 where the control unit 110 assigns the UATI to the terminal requesting handoff and establishes a session. Then, at step S27, the control unit 110 stores the UATI assigned to the terminal as a "connected terminal UATI" in the terminal information table TB. In addition, the control unit 110 adds 1 to a "number of sessions" in the terminal information table TB at step S28.

Next, the connected terminal number determination unit 146, at step S29, determines whether the number of sessions (the number of connected terminals) has reached the number of registered terminals, with reference to the terminal information table TB stored in the memory unit 150. If the number of sessions has reached the number of registered terminals, it means that all of the registered terminals allowed to use the femtocell FAP have established sessions (location registration) with the femtocell FAP. Therefore, the processing shifts to step S32, where the pilot beacon transmission unit 130 stops transmission of the pilot beacon. In contrast, if the number of sessions is under the number of registered terminals at step S29, the processing returns to step S21 where the femtocell FAP continues transmission of the pilot beacon in order to encourage a terminal to perform handoff.

Here, the terminal information table TB shown in FIG. 4 is described again. Whereas the number of registered terminals allowed to use the femtocell FAP is "3", the number of terminals having the session established (on standby or in connection with the femtocell FAP) is 2 in an example in the figure. As can be seen in the figure, UATIs "0x011a2b3c" and "0x017d89ef" are assigned to these 2 terminals. In the example in the figure, since not all the registered terminals allowed to use the femtocell FAP have established sessions, the femtocell FAP continues transmission of the pilot beacon.

Figure 6:
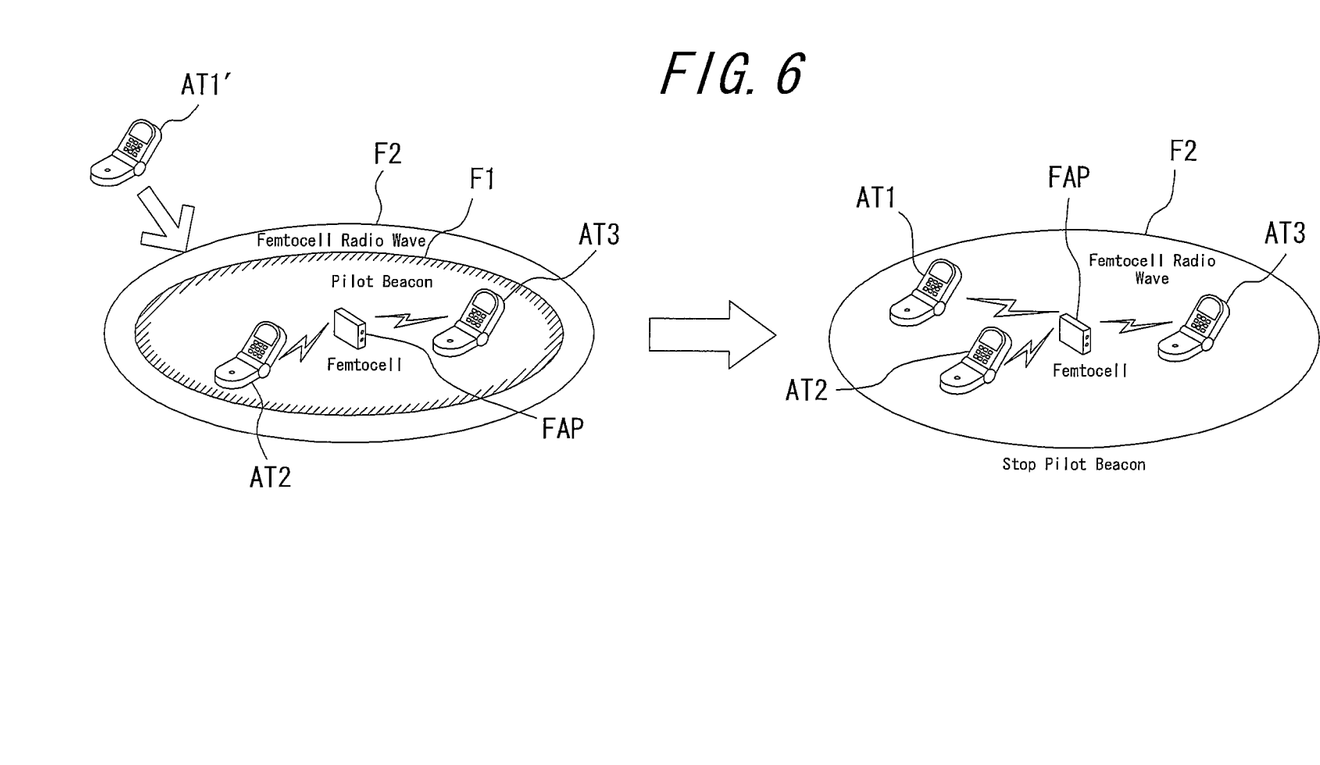
FIG. 6 is a schematic diagram illustrating a condition for the femtocell FAP to stop transmission of the pilot beacon.

A condition to stop transmission of the pilot beacon at step S32 in a flowchart shown in FIG. 5 is described with reference to a figure. FIG. 6 is a schematic diagram illustrating the condition for the femtocell FAP to stop transmission of the pilot beacon. Here, it is assumed that the terminal information table TB of the femtocell FAP in FIG. 6 has contents as shown in FIG. 4. If the terminals AT2 and the AT3 establish sessions and thus the number of sessions (number of connected terminals) is "2", it satisfies the number of registered terminals "3"> the number of sessions "2". Therefore, the femtocell FAP transmits a pilot beacon F1 together with femtocell radio waves F2. Here, if a terminal AT1' performs handoff and establishes a session with the femtocell FAP (becomes terminal AT1), it is determined that the number of sessions has reached the number of registered terminals "3" and transmission of the pilot beacon F1 is stopped.

According to the present invention, as stated above, transmission of the pilot beacon is stopped at a point when all of the registered terminals allowed to use the femtocell FAP establish sessions therewith. Therefore, it is possible to prevent interference to the macrocell as much as possible. In addition, since the pilot beacon is not transmitted unnecessarily, it is possible to avoid waste of power and to reduce power consumption significantly.

Next, processing of the femtocell FAP, which has stopped transmission of the pilot beacon, to restart transmission of the pilot beacon is described. The femtocell FAP restarts transmission of the pilot beacon if the number of sessions becomes less than the number of registered terminals since a terminal performs handoff from the femtocell FAP to another base station. The femtocell cannot recognize that a registered terminal performs handoff to the macrocell and thus maintains the session with the terminal which has already performed handoff. Accordingly, it is necessary to provide a system to inform the femtocell that the registered terminal has performed handoff and established a session with the macrocell. Before the system, which will be described below, the processing to restart transmission of the pilot beacon by the femtocell FAP is described with reference to a flowchart.

Figure 7:
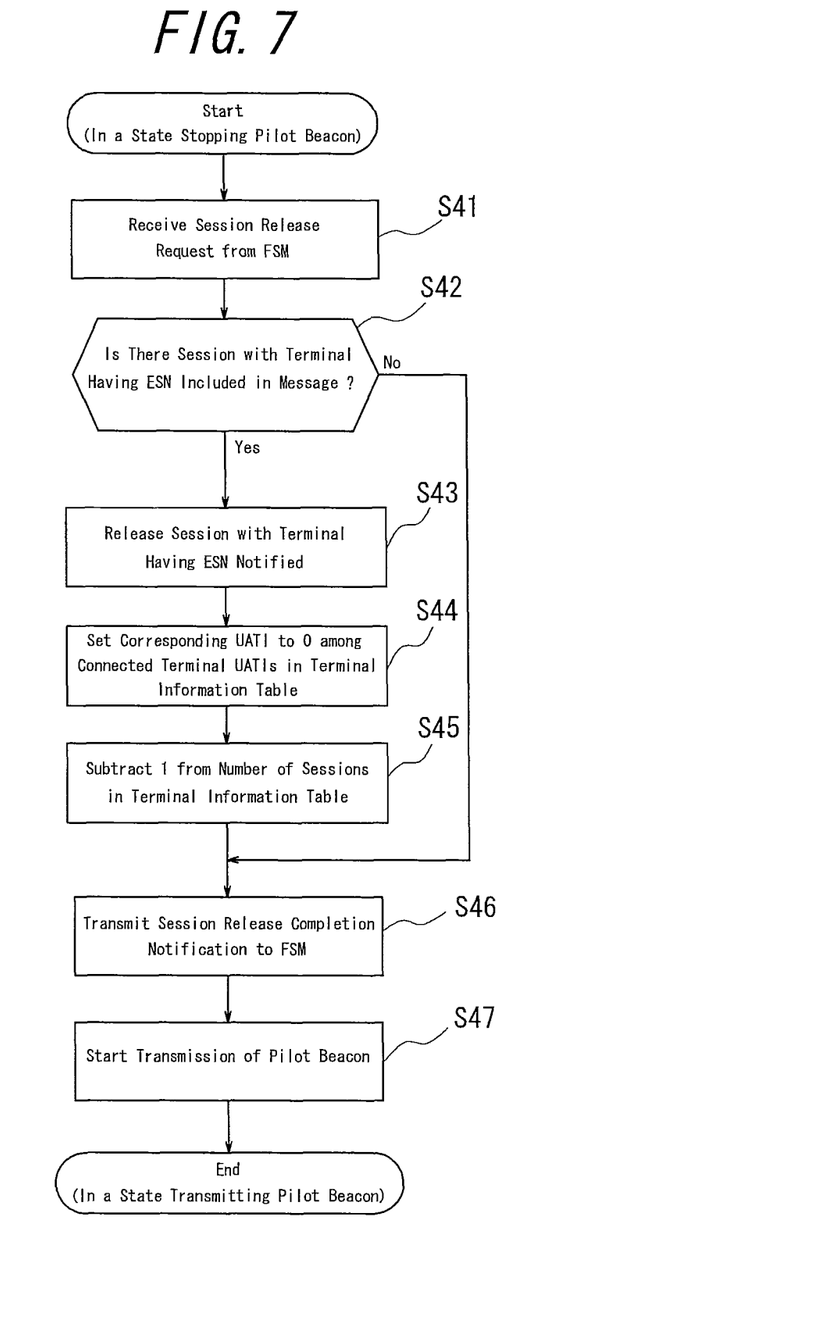
FIG. 7 is an exemplary flowchart of processing to start transmission of the pilot beacon by the femtocell FAP.

FIG. 7 is an exemplary flowchart of the processing to restart transmission of the pilot beacon by the femtocell FAP. At start of the processing shown in FIG. 7, the femtocell FAP has not yet recognized handoff of a registered terminal and thus keeps stopping transmission of the pilot beacon. At step S41, first, the wired communication unit 160 receives a session release request message from the femtocell service manager FSM. The session release request message includes an ESN of the terminal with which a session is requested to be released. At step S42, next, the session existence determination unit 148 determines whether there is a session with the terminal having the ESN included in the message received. This is based on an assumption that a session with the terminal may be already released by a keep alive function or some network failure.

If it is determined at step S42 that there is a session, the processing shifts to step S43, where the control unit 110 releases the session with the terminal having the ESN included in the message. Then, at step S44, the control unit 110 deletes the UATI or set "0" thereto, which is assigned to the terminal having the ESN with which the session is released, among the connected terminal UATIs ("connected terminal UATI" in the terminal information table TB) stored in the connected terminal UATI memory unit 155. Next, at step S45, the control unit 110 subtracts 1 from the number of sessions ("number of sessions" in the terminal information table TB) stored in the session number memory unit 154.

After step S45, or if it is determined at step S42 that there is no session with the terminal having the ESN included in the message, the processing shifts to step S46. At step S46, the control unit 110 transmits a session release completion notification to the femtocell service manager FSM via the wired communication unit 160. Then, at step S47, the pilot beacon transmission control unit 130 starts transmission of the pilot beacon.

Figure 8:
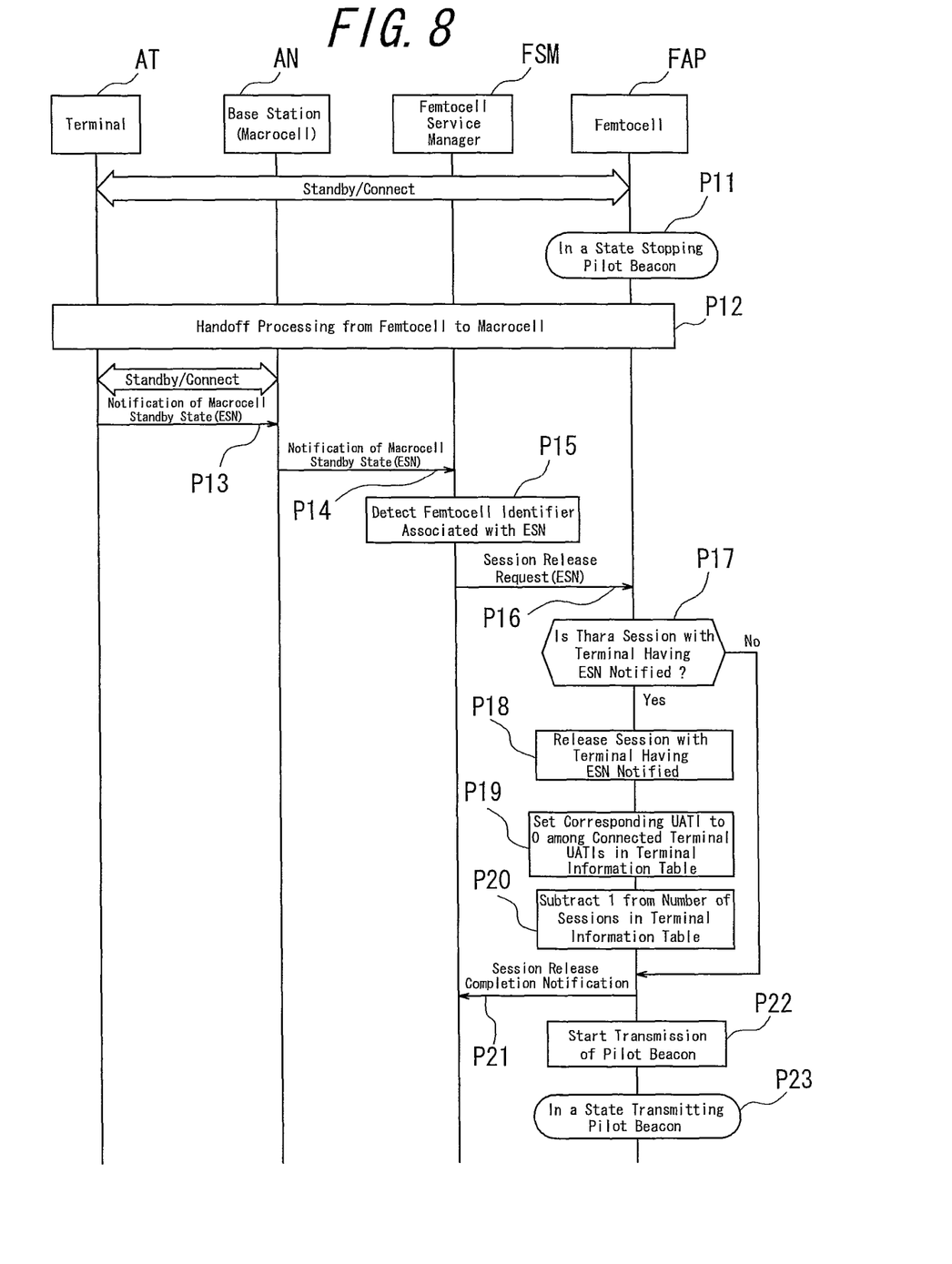
FIG. 8 is a sequence diagram illustrating processing when a terminal AT performs handoff from the femtocell FAP to a macrocell AN and the femtocell FAP restarts transmission of the pilot beacon.
Figure 9:
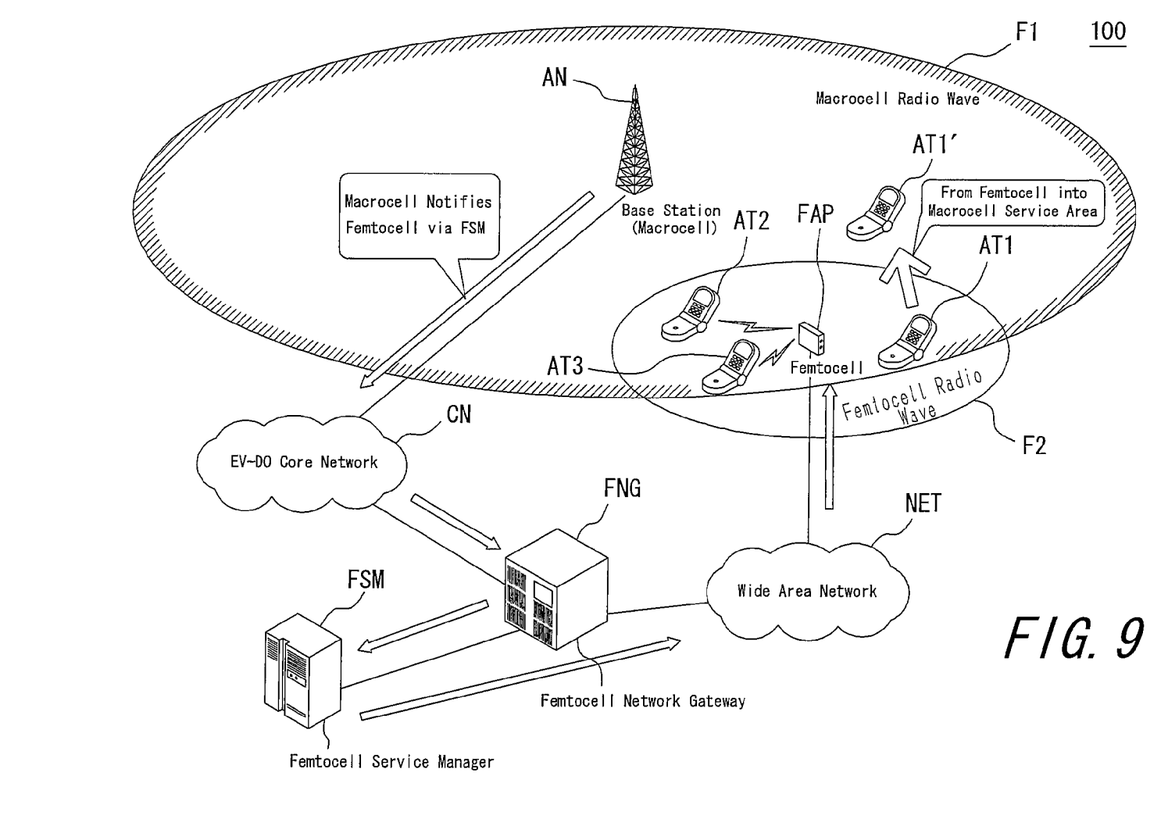
FIG. 9 is a schematic diagram illustrating the sequence of FIG. 8 in a mobile communication system 100.
Figure 10:
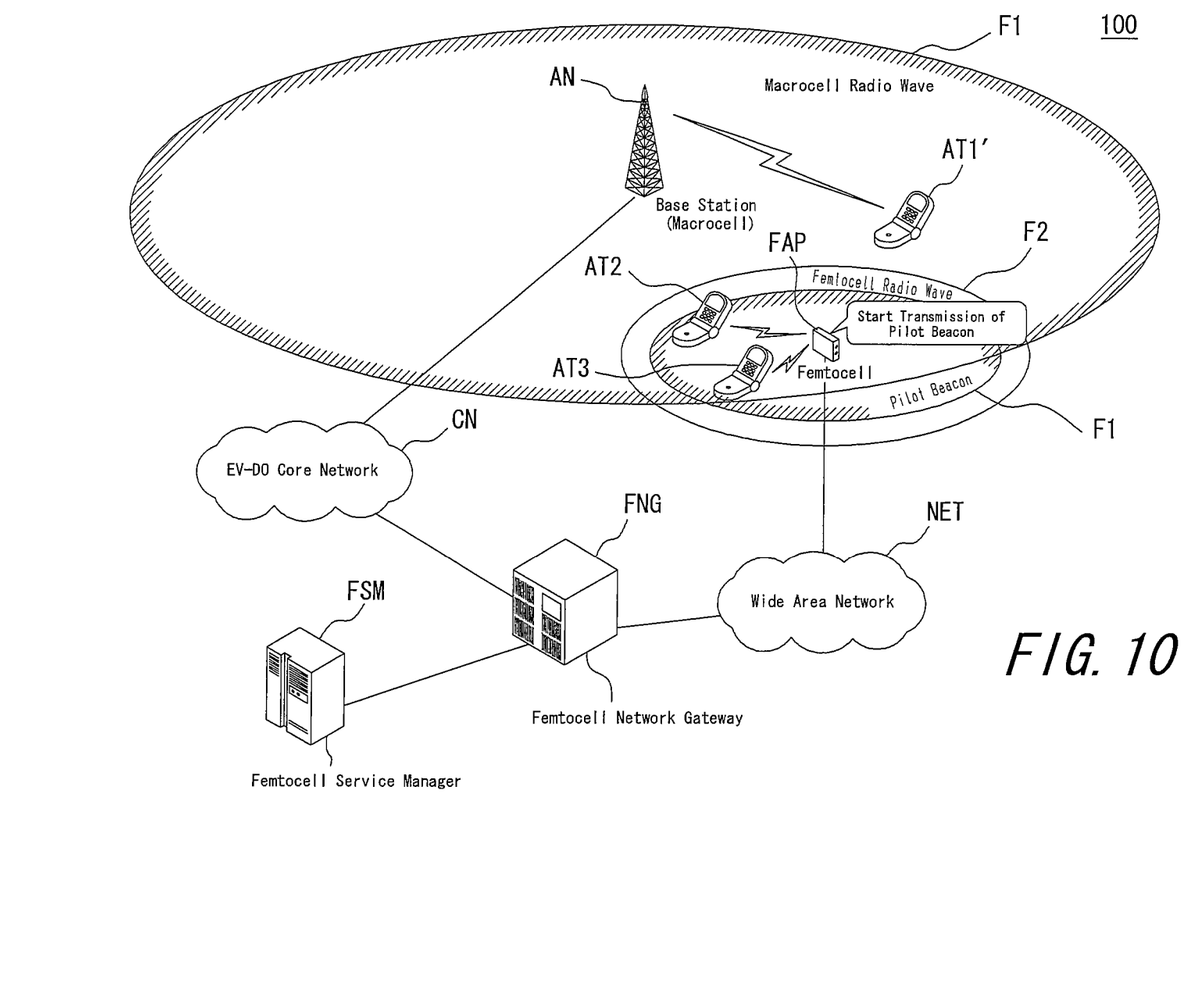
FIG. 10 is a schematic diagram illustrating the sequence of FIG. 8 in the mobile communication system 100.

Next, the system to inform the femtocell that the registered terminal has performed handoff from the femtocell and is in the standby state in the macrocell will be described with reference to FIG. 8 to FIG. 10. FIG. 8 is a sequence diagram illustrating processing in which the terminal AT performs handoff from the femtocell FAP to the macrocell AN and the femtocell FAP restarts transmission of the pilot beacon. FIG. 9 and FIG. 10 are schematic diagrams illustrating the above sequence in the mobile communication system 100.

As shown in FIG. 8, it is assumed that the terminal AT (terminal AT1 in FIG. 9) has established a session (standby/connection) with the femtocell FAP and the femtocell FAP stops transmission of the pilot beacon at step S11. In this state, the terminal AT (AT1) performs handoff from the femtocell FAP to the macrocell AN (step S12) and the terminal AT establishes a session (standby/connection) with the macrocell AN (the terminal AT1' moved from a femtocell service area to a macrocell service area in FIG. 9). Then, the terminal AT transmits a message "macrocell standby notification" informing that it is in the standby state in the macrocell AN to the macrocell AN (step P13). The macrocell standby notification includes an ESN of the terminal AT (AT1, AT1') which has performed handoff. In addition, the macrocell AN transmits the macrocell standby notification received from the terminal to the femtocell service manager FSM (step P14).

Upon reception of the macrocell standby notification at step P14, the femtocell service manager FSM detects a femtocell identifier corresponding to and associated with the ESN included in the macrocell standby notification (step P15). In addition, the femtocell service manager FSM transmits a "session release request" to request release of a session with the terminal having the ESN included in the macrocell standby notification to the femtocell FAP having the femtocell identifier detected (step P16). The "session release request" includes the ESN of the terminal having a session to be released. That is, as shown in FIG. 9, the session release request is transmitted from the terminal AT1', which has performed handoff from the femtocell to the macrocell, to the femtocell FAP via the macrocell AN, the EV-DO core network CN, the femtocell network gateway FNG and the femtocell service manager FSM.

Upon reception of the session release request, the femtocell FAP carries out processing at steps P17-P22 and restarts transmission of the pilot beacon F1 as shown in FIG. 10 (step P23). Since the processing at steps P17-P22 are the same as that at steps S42-S47, descriptions thereof are omitted.

It may happen that a session with a terminal is releases by reasons, other than the request from the femtocell service manager FSM, such as the keep alive function, some network failure or the like. In such a case, although it is not shown in the sequence in FIG. 8, the femtocell FAP carries out the same processing (steps P17-P23) as that after release of the session as described above. In this case, however, the session release completion notification (step P21) is not transmitted to the femtocell service manager FSM.

In addition, methods to release a session with a terminal is not limited to the above description. For example, it may be supposed that the macrocell AN stores in advance information on nearby femtocells and information on terminals registered with each of the femtocells and one of the registered terminals has established a session with the macrocell AN. In this case, the macrocell AN itself may transmit the session release request to the femtocell FAP with which the terminal having the established session is registered. It is also possible that the PCF of the EV-DO core network CN releases the session by transmitting a handoff signal informing of handoff to the femtocell FAP by using A13 interface connecting PCFs. Moreover, conditions of sessions may be monitored at predetermined intervals. In this case, an SMP close timer (normally every 54 hours) or a keep alive timer (normally every 18 hours) for releasing a session after a predetermined time is set to a very short time for the femtocell FAP, such that a condition of a session with a terminal is checked at short intervals.

Although the ESN is used as the terminal identifier in the above embodiment, any identifier which may be obtained from the network by the femtocell may be used. The identifier may be information on a user corresponding to a mobile terminal, such as subscriber information, for example. In addition, although the ESN of the terminal is obtained from the EV-DO core network CN in the above embodiment, the present invention is not limited thereto. For example, the femtocell FAP itself may inquire about the identifier to the terminal by transmitting a hardware ID request message directly to the terminal. The hardware ID is an identifier unique to a terminal and includes such as ESN, MEID (Mobile Equipment Identifier) or the like.

Moreover, although CDMA2000 1xEV-DO is used as the mobile communication system in the above embodiment, the present invention is not limited thereto but is applicable to a system of W-CDMA scheme (HSDPA or the like), for example. In this case, the terminal performs location registration (establishment of a session) with the femtocell FAP and the macrocell AN, not by assignment of the UATI as described above but by a method in accordance with the W-CDMA scheme.

Now, advantages of the present invention are described once again. According to the present invention, if all of the registered terminals are in the standby state in the femtocell, transmission of the pilot beacon at the same frequency as the radio waves of the macrocell is stopped. Thereby, it is possible to prevent interference between the macrocell and the pilot beacon as much as possible. In addition, according to the present invention, since the femtocell restarts transmission of the pilot beacon if the registered terminal performs handoff to the macrocell or a session with the registered terminal is released, it allows the terminal to perform handoff from the macrocell to the femtocell as necessary. Moreover, according to the present invention, since the pilot beacon is not transmitted unnecessarily, it may reduce waste of power.

Although the present invention is described based on the figures and the embodiment, it is appreciated that those skilled in the art may easily vary or modify in a multiple manner based on disclosure of the present invention. Accordingly, such variation and modification are included in a scope of the present invention. For example, function and the like included in each unit, step or the like can be rearranged avoiding a logical inconsistency, and a plurality of components or steps can be combined to one or divided. For example, although the maximum number of registerable terminals and the information on the registered terminals are stored in the femtocell, such information can be stored in the femtocell service manager FSM, another control server or the like on a network side. In this case, the femtocell may inquire about the information to the network side as necessary.

In addition, according to the above embodiment, in order to reduce interference between the pilot beacon and the macrocell, transmission of the pilot beacon is stopped if all of the registered terminals have established sessions with the femtocell. However, a condition to stop transmission of the pilot beacon is not limited thereto. For example, if there is no registered terminal in the femtocell service area, the femtocell may stop transmission of the femtocell radio wave F2 and restart it when detecting the registered terminal. In this case, accordingly, it is possible to transmit the pilot beacon F1 together with the femtocell radio wave F2. It is also possible to store in advance a time for the femtocell to have sessions with the registered terminals and to compile statistics of the time for a predetermined period, in order to stop transmission of the pilot beacon at a time with low probability of establishment of sessions and to transmit it only at a time with high probability of establishment of sessions.

Moreover, the femtocell may have a home server function. In this case, start of transmission of the pilot beacon may be triggered by turn-on of network equipment connected to the femtocell. With a combination of this example and a condition to stop transmission of the pilot beacon after establishment of sessions with all of the registered terminals, it is possible to further reduce interference between the pilot beacon and the macrocell. It is appreciated that not only the pilot beacon but any signals to allow the terminal (mobile terminal) to detect a base station of the present invention are included within the scope of the present invention.

REFERENCE SIGNS LIST 100 mobile communication system
110 control unit
120 wireless communication unit
130 pilot beacon transmission control unit
140 determination unit
142 registered terminal number determination unit
144 ESN registration determination unit
146 connected terminal number determination unit
148 session existence determination unit
150 memory unit
151 maximum registrable number memory unit
152 registered terminal number memory unit
153 registered terminal ESN memory unit
154 session number memory unit
155 connected terminal UATI memory unit
160 wired communication unit
ANT antenna
AT1-AT8 terminal (mobile terminal)
AN macrocell (wide area base station)
CN EV-DO core network
FNG femtocell network gateway
FSM femtocell service manager
NET wide area network
FAP femtocell
F1 macrocell radio wave, pilot beacon
F2 femtocell radio wave

The invention claimed is:

1. A base station of a mobile communication system comprising:
   a transmission unit for transmitting a pilot beacon such that a mobile terminal detects the base station, wherein the pilot beacon is transmitted at a first frequency within a first cell at least part of which is located within a second cell that transmits a second radio wave at said first frequency;
   a registration unit for registering information on a mobile terminal to use the base station; and
   a control unit for controlling the transmission unit to stop transmission of the pilot beacon at said first frequency if all of terminals registered with the registration unit perform location registration to the base station,
   wherein the control unit controls the transmission unit to stop transmission of a first radio wave of the base station at a second frequency when no registered mobile terminals are in a service area of the base station, and to transmit the first radio wave at said second frequency together with the pilot beacon at said first frequency when a registered mobile terminal is detected in the service area of the base station.

2. The base station according to claim 1, wherein the control unit controls the transmission unit to restart transmission of the pilot beacon when a mobile terminal which has performed location registration to the base station is released while the transmission of the pilot beacon is stopped.

3. A control method of a base station of a mobile communication system comprising the steps of:
   transmitting a pilot beacon such that a mobile terminal detects the base station, wherein the pilot beacon is transmitted at a first frequency within a first cell at least part of which is located within a second cell that transmit a second radio wave at said first frequency;
   registering information on a mobile terminal to use the base station or a user; and
   controlling to stop transmission of the pilot beacon at said first frequency if all of terminals registered with the base station perform location registration to the base station; and
   controlling to stop transmission of a first radio wave of the base station at a second frequency when no registered mobile terminals are in a service area of the base station, and to transmit the first radio wave at said second frequency together with the pilot beacon at said first frequency when a registered mobile terminal is detected in the service area of the base station.

4. The base station according to claim 1, wherein the control unit controls the transmission unit to start and stop transmission of the pilot beacon, based on a time for the base station to have sessions with the registered mobile terminals.

5. The base station according to claim 1, wherein the control unit controls the transmission unit to start transmission of the pilot beacon when network equipment connected to the base station is turned on.

* * * * *